(12) United States Patent
Ozaki

(10) Patent No.: US 7,594,131 B2
(45) Date of Patent: Sep. 22, 2009

(54) PROCESSING APPARATUS

(75) Inventor: Shinji Ozaki, Suita (JP)

(73) Assignee: Panasonic Corporation, Osaka (JP)

( * ) Notice: Subject to any disclaimer, the term of this patent is extended or adjusted under 35 U.S.C. 154(b) by 556 days.

(21) Appl. No.: 11/200,193

(22) Filed: Aug. 10, 2005

(65) Prior Publication Data

US 2006/0064679 A1 Mar. 23, 2006

(30) Foreign Application Priority Data

Aug. 19, 2004 (JP) .............................. 2004-239397

(51) Int. Cl.
*G06F 1/32* (2006.01)
*G06F 1/26* (2006.01)

(52) U.S. Cl. ................... 713/320; 713/300; 713/324; 711/1; 712/1

(58) Field of Classification Search ................ 713/300, 713/310, 320–324, 330, 340; 711/1; 712/1
See application file for complete search history.

(56) References Cited

U.S. PATENT DOCUMENTS

| 6,148,408 | A * | 11/2000 | Shimoda .................. 713/320 |
| 6,317,840 | B1 | 11/2001 | Dean et al. |
| 6,564,328 | B1 * | 5/2003 | Grochowski et al. ........ 713/320 |
| 6,564,332 | B1 | 5/2003 | Nguyen et al. |
| 6,651,176 | B1 | 11/2003 | Soltis, Jr. et al. |
| 6,775,787 | B2 * | 8/2004 | Greene .................... 713/340 |
| 6,785,761 | B2 | 8/2004 | Lin |
| 6,826,704 | B1 | 11/2004 | Pickett |
| 7,243,243 | B2 * | 7/2007 | Gedeon .................... 713/300 |
| 7,254,812 | B1 * | 8/2007 | Menezes .................. 718/102 |
| 2002/0049920 | A1 | 4/2002 | Staiger |
| 2002/0194513 | A1 | 12/2002 | Ishibashi et al. |
| 2003/0204759 | A1 * | 10/2003 | Singh ...................... 713/320 |
| 2004/0073749 | A1 | 4/2004 | Parthasarathy et al. |
| 2004/0163000 | A1 | 8/2004 | Kuhlmann et al. |
| 2004/0268159 | A1 * | 12/2004 | Aasheim et al. ............ 713/300 |
| 2005/0081073 | A1 * | 4/2005 | Williams .................. 713/320 |
| 2006/0020831 | A1 * | 1/2006 | Golla et al. ............... 713/300 |
| 2007/0008887 | A1 * | 1/2007 | Gorbatov et al. ........... 370/230 |

FOREIGN PATENT DOCUMENTS

| JP | 8-77000 | 3/1996 |
| WO | 02/073336 | 9/2002 |

OTHER PUBLICATIONS

English language Abstract of JP 8-77000.

* cited by examiner

*Primary Examiner*—Thomas Lee
*Assistant Examiner*—Fahmida Rahman
(74) *Attorney, Agent, or Firm*—Greenblum & Bernstein P.L.C.

(57) ABSTRACT

The processing apparatus in the present invention is a processing apparatus which executes a program and performs processes of the program, and includes the following: an execution circuit having a plurality of operation modes, each of which has a different effect on the processing performance and the power consumption of the processing apparatus; a measurement unit operable to measure at least one of a process execution performance and an execution power consumption of the processor circuit; and a control unit operable to compare a target value and a measurement result from the measurement unit, and to switch the operation modes in accordance to a result of the comparison.

18 Claims, 11 Drawing Sheets

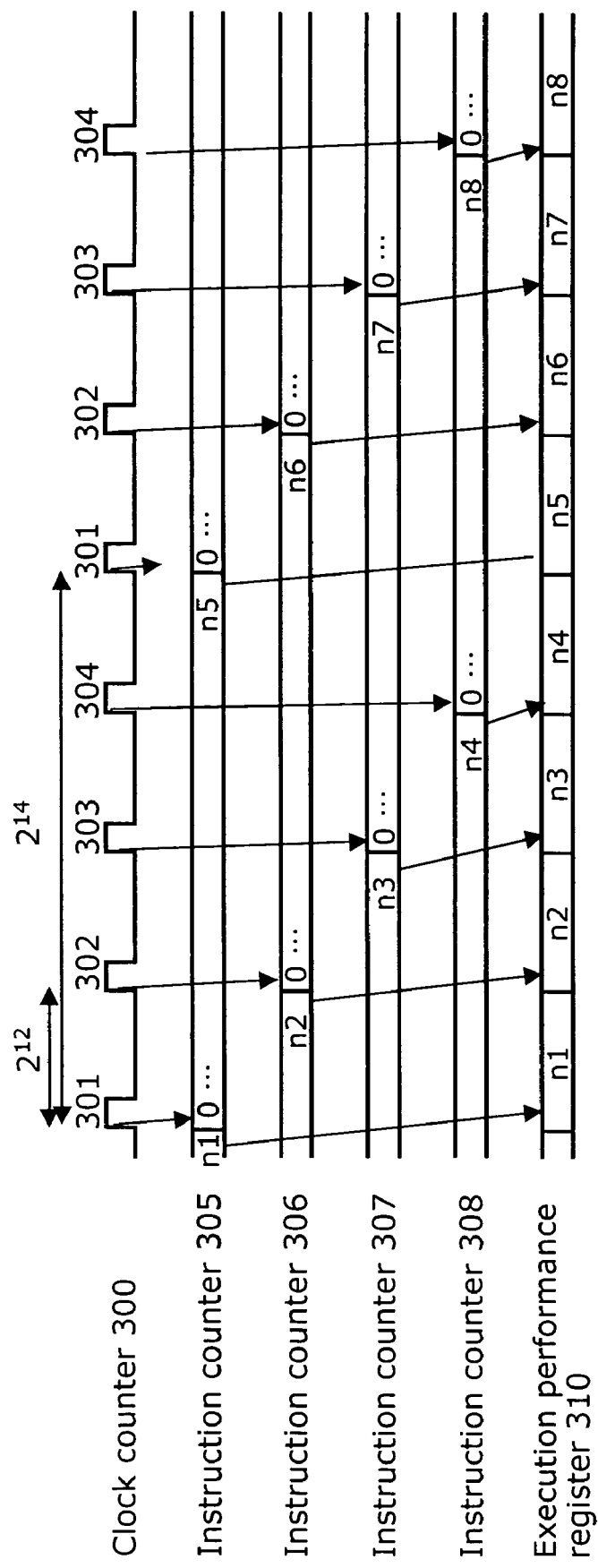

PROCESSING APPARATUS

BACKGROUND OF THE INVENTION (1) Field of the Invention

The present invention relates to a processing apparatus for use in an LSI such as a microprocessor.

(2) Description of the Related Art

In recent times, the performance of processing apparatuses such as microprocessors and digital signal processors (DSP) has been improving from year to year. With high-performance microprocessors in particular, the improvement of processing capability is realized through the addition of augmentative circuit elements and functions such as a large-capacity cache memory, a superscalar architecture, and a speculative instruction execution mechanism. On the other hand, the increase in power consumption due to the addition of such augmentative circuit elements has become a problem for the LSI and systems equipped with an LSI. Accordingly, the suppression of power consumption while realizing required performance has become an issue in the development of microprocessors.

With respect to this issue, technology such as that disclosed in Japanese Laid-Open Patent Application No. 8-77000 Publication (page 2 to 4 and FIG. 4) is being used in the conventional microprocessor. More specifically, the conventional processor includes an instruction cache which is placed inside the processor and which provides instructions at extremely high speed, a branch target buffer which holds data such as a predicted branch target instruction and a history bit, and a prefetch buffer which holds the instructions provided by the instruction cache for decoding using an instruction decoder. Such microprocessors have a method for reducing the power consumed by the processor by reducing unnecessary prefetch access of the instruction cache when a branch instruction is executed. To be more specific, with respect to each branch instruction to be executed, in the case where the instruction for the predicted branch target address is present in the prefetch buffer, accesses to the instruction cache are eliminated and power consumption is reduced by performing a control which locks the prefetch buffer and a control that prohibits prefetching, and providing the instruction for the branch target address from the prefetch buffer instead of the instruction cache.

In the conventional processor circuit which is configured in the manner described above, reduction of power consumed by the processor is realized by prohibiting unnecessary prefetching to the instruction cache. However, in a situation where the processor is actually being used, the upper limit of the processing details required from such processor, in other words, the processing performance of the processor, and the allowable amount of power consumption during operation of the processor, are fixed. In such a usage situation, the required processing performance can be sufficiently brought out through the conventional method of prohibiting unnecessary prefetching. However, with regard to power consumption, there are cases where a sufficient reduction effect is not obtained and it is not possible to go below the allowable amount of power consumption.

In addition, although a method which extends the cycle time of a CPU clock provided to a processor (CPU) exists as a method for reducing power consumption, there are cases where, depending on the details of a program executed by the processor, and the condition under which it is executed, the required processing performance cannot be obtained.

SUMMARY OF THE INVENTION

An objective of the present invention is to provide a processing apparatus which can reduce power consumption to the fullest extent while bringing out the required processing performance, in the case where the processing performance required from such processor is fixed.

Furthermore, another objective of the present invention is to provide a processing apparatus which can bring out maximum processing performance while keeping power consumption within a limit, in the case where the allowable power consumption for such processor is fixed.

In addition, yet another objective of the present invention is to provide a processing apparatus which can reduce power consumption to the fullest extent while bringing out a required processing performance, and which, in addition, has a reduced circuit area.

In order to achieve the aforementioned objectives, the processing apparatus in the present invention, is a processing apparatus which executes a program and performs processes of the program, said processing apparatus including an execution circuit having a plurality of operation modes, each having a different effect on processing performance and power consumption of said processing apparatus, a measurement unit which measures at least one of a process execution performance and an execution power consumption of said processing apparatus and a control unit which compares a target value and a measurement result from said measurement unit, and to switch the operation modes in accordance to a result of the comparison. According to this structure, in the case where the power consumption allowed for the processor is fixed, maximum processing performance can be brought out while keeping power consumption within the limit. Furthermore, power consumption can be reduced to the fullest extent, while bringing out the required processing performance.

Here, said execution circuit may include a plurality of instruction execution pipeline units, each of which executes an instruction, and an instruction issuance unit which simultaneously issues a plurality of instructions to said plurality of instruction execution pipeline units, and said measurement unit measures at least one of the process execution performance and the execution power consumption, based on the number of instructions processed by said plurality of instruction execution pipeline units per predetermined period of time. Furthermore, said instruction issuance unit may have a plurality of operation modes, each having a different maximum allowable number for said number of instructions that are allowed to be simultaneously issued to said plurality of instruction execution pipeline units, said measurement unit measures said number of instructions as the process execution performance of said processing apparatus, and said control unit switches a current operation mode of said instruction issuance unit a) to an operation mode having a lower maximum allowable number, in the case where the process execution performance measured by said measurement unit exceeds the target value, and b) to an operation mode having a higher maximum allowable number, in the case where the process execution performance measured by said measurement unit is below the target value. Furthermore, said measurement unit may measure, as the process execution performance, said number of instructions that are completely executed by said instruction execution pipeline units per predetermined period of time. Here, the processing apparatus may further include a rewritable register onto which the target value is set. Furthermore, said instruction issuance unit may further have an operation mode in which the instructions can be speculatively issued to said instruction execution pipeline units, and said control unit switches the operation mode of said instruction issuance unit to the operation mode in which the instructions can be speculatively issued, in the case where the process execution performance measured by said measurement unit is below the target value.

Here, said instruction issuance unit may have a plurality of operation modes, each having a different maximum allowable number for said number of instructions that are allowed to be simultaneously issued to said plurality of instruction execution pipeline units, said measurement unit measures said number of instructions as the execution power consumption of said processing apparatus, and said control unit switches a current operation mode of said instruction issuance unit a) to an operation mode having a lower maximum allowable number, in the case where the execution power consumption measured by said measurement unit exceeds the target value, and b) to an operation mode having a higher maximum allowable number, in the case where the execution power consumption measured by said measurement unit is below the target value.

Furthermore, said measurement unit may measure, as the execution power consumption, said number of instructions that are issued to said instruction execution pipeline units per predetermined period of time. Furthermore, the processing apparatus may further include a rewritable register onto which the target value is set. Furthermore, said instruction issuance unit may further have an operation mode in which the instructions can be speculatively issued to said instruction execution pipeline units, and said control unit switches the operation mode of said instruction issuance unit to the operation mode in which the instructions can be speculatively issued, in the case where the execution power consumption measured by said measurement unit is below the target value.

Here, the processing apparatus may include a cache memory having an N-way set-associative structure with N ways in which one line is made up of plural words, wherein said cache memory includes a data memory array, said data memory array can be read-out using one of a type one read-out and a type two read-out, in the type one read-out, plural words in the same word positions within respective lines are simultaneously read-out from corresponding lines belonging to different ways, in the type two read-out, plural words making up one line of one way are simultaneously read-out, said cache memory has a first operation mode and a second operation mode, in the first operation mode, a word belonging to a way which is hit by a memory access is selected from among the plural words read-out using the type one read-out, and the selected word is outputted, in the second operation mode, plural words are read-out, from a way which is predicted to be hit, using the type two read-out, and a) in the case where the predicted way is hit, the plural words are sequentially selected and outputted, and b) in the case where a way other than the predicted way is hit, plural words are further read-out, from the way which is hit, using the type two read-out, and the selected plural words are sequentially selected and outputted, said measuring unit measures said number of instructions as the process execution performance of said processing apparatus, and said control unit controls said cache memory to operate a) in the second operation mode, in the case where the process execution performance measured by said measurement unit exceeds the target value, and b) in the first operation mode, in the case where the process execution performance measured by said measurement unit is below the target value. Furthermore, said measurement unit may measure, as the process execution performance, said number of instructions that are completely executed by said instruction execution pipeline units per predetermined period of time. Furthermore, the processing apparatus may further include a rewritable register onto which the target value is set. Furthermore, said data memory array may be made up of a plurality of SRAM memories which can be read-out in word-widths. Furthermore, said data memory array may be made up of one or more SRAM memories which can be read-out in multiple word-widths, each of the SRAM memories is made up of plural columns, and the SRAM memory receives a signal separately for each of the words, the signal controlling selection of the columns.

Here, the processing apparatus may further include a cache memory having an N-way set-associative structure with N ways in which one line is made up of plural words, wherein said cache memory includes a data memory array, said data memory array can be read-out using one of a type one read-out and a type two read-out, in the type one read-out, plural words in the same word positions within respective lines are simultaneously read-out from corresponding lines belonging to different ways, in the type two read-out, plural words making up one line of one way are simultaneously read-out, said cache memory has a first operation mode and a second operation mode, in the first operation mode, a word belonging to a way which is hit by a memory access is selected from among the plural words read-out using the type one read-out, and the selected word is outputted, in the second operation mode, plural words are read-out, from a way which is predicted to be hit, using the type two read-out, and a) in the case where the predicted way is hit, the plural words are sequentially selected and outputted, and b) in the case where a way other than the predicted way is hit, plural words are further read-out, from the way which is hit, using the type two read-out, and the selected plural words are sequentially selected and outputted, said measuring unit measures said number of instructions as the execution power consumption of said processing apparatus, and said control unit controls said cache memory to operate a) in the second operation mode, in the case where the execution power consumption measured by said measurement unit exceeds the target value, and b) in the first operation mode, in the case where the execution power consumption measured by said measurement unit is below the target value. Furthermore, said measurement unit may measure, as the execution power consumption, the number of memory access instructions which cause said data memory array to be read-out per predetermined period of time. Furthermore, the processing apparatus may further include a rewritable register onto which the target value is set. Furthermore, said data memory array may be made up of a plurality of SRAM memories which can be read-out in word-widths. Furthermore, said data memory array may be made up of one or more SRAM memories which can be read-out in multiple word-widths, each of the SRAM memories is made up of plural columns, and the SRAM memory receives a signal separately for each of the words, the signal controlling selection of the columns.

Here, said measurement unit may measure the processing performance of said processing apparatus as the process execution performance, and said control unit to switches a current operation mode of said execution circuit a) to an operation mode having a lower processing performance, in the case where the process execution performance measured by said measurement unit exceeds the target value, and b) to an operation mode having a lower processing performance, in the case where the process execution performance measured by said measurement unit is below the target value.

Here, said measurement unit may measure the power consumption of said processing apparatus as the execution power consumption, and said control unit switches a current operation mode of said execution circuit a) to an operation mode which has a lower processing performance, in the case where the execution power consumption measured by said measurement unit exceeds the target value, and b) to an operation mode which has a higher processing performance, in the case where the execution power consumption measured by said measurement unit is below the target value.

Here, said execution circuit may include a plurality of central processing units, each having a respective cache memory, each of said respective cache memories has an N-way set-associative structure with N ways in which one line is made up of plural words, each of said respective cache memories is made up of a data memory array which is simultaneously read-out in multiple-word-widths, said data memory array can be read-out using one of a type one read-out and a type two read-out, in the type one read-out, plural words in the same word positions within respective lines are simultaneously read-out from corresponding lines belonging to different ways, in the type two read out, plural words making up one line of one way are simultaneously read-out, said cache memory has a first read-out mode and a second read-out mode, in the first read-out mode, a word belonging to a way which is hit by a memory access is selected from among the plural words read-out using the type-one read out, and the selected word is outputted, in the second read-out mode, plural words are read-out from a way which is hit, using the type-two read out, and read-out plural words are outputted, the first read-out mode is used in the case where the plurality of said central processing units accesses said respective cache memories, and the second read-out mode is used in the case where data is transmitted between respective cache memories of said plurality of central processing units. Furthermore, said data memory array may be made up of a plurality of SRAM memories which can be read-out in word-widths. Furthermore, said data memory array may be made up of one or more SRAM memories which can be read-out in multiple word-widths, each of the SRAM memories is made up of plural columns, and the SRAM memory receives a signal separately for each of the words, the signal controlling selection of the columns.

As explained above, according to processing apparatus in the present invention, by i) switching between the use or non-use of motivated instruction issuance, or ii) switching the number of instructions that can me issued simultaneously, or iii) switching the method for accessing data arrays of a cache, in accordance to the processing performance required by a program and the condition of the moment-to-moment processing performance brought out by a central processing unit (CPU), performance of a CPU operation which suppresses power consumption to the fullest extent while bringing out a target performance required by the program is realized.

Furthermore, according to processing apparatus in the present invention, by i) switching between the use or non-use of motivated instruction issuance, or ii) switching the number of instructions that can me issued simultaneously, or iii) switching the method for accessing data arrays of a cache, in accordance to the power consumption allowed for the program and the condition of the moment-to-moment power consumption of the CPU, performance of an operation which brings out maximum processing performance while maintaining the power consumption allowed for the program is realized.

Furthermore, according to processing apparatus in the present invention, the multiprocessor structure in which each CPU includes a cache memory allows two words making up a line of a way in a cache memory to be stored in arrays, which are different data memory arrays, and read out simultaneously. Therefore, in the case where transmission of the instructions or data stored in the lines is carried out between cache memories, the number of read-out accesses to the data memory arrays can be held down to a minimum, and factors hampering normal accesses to the cache memories can be reduced.

FURTHER INFORMATION ABOUT TECHNICAL BACKGROUND TO THIS APPLICATION

The disclosure of Japanese Patent Application No. 2004-239397 filed on Aug. 19, 2004 including specification, drawings and claims is incorporated herein by reference in its entirety.

BRIEF DESCRIPTION OF THE DRAWINGS

These and other objects, advantages and features of the invention will become apparent from the following description thereof taken in conjunction with the accompanying drawings that illustrate a specific embodiment of the invention. In the Drawings:

FIG. 3B is a time chart diagram for the processing performance measurement unit in the same embodiment.

DESCRIPTION OF THE PREFERRED EMBODIMENT(S)

Hereinafter, the embodiments of the present invention shall be explained with reference to the diagrams.

First Embodiment

Figure 1:
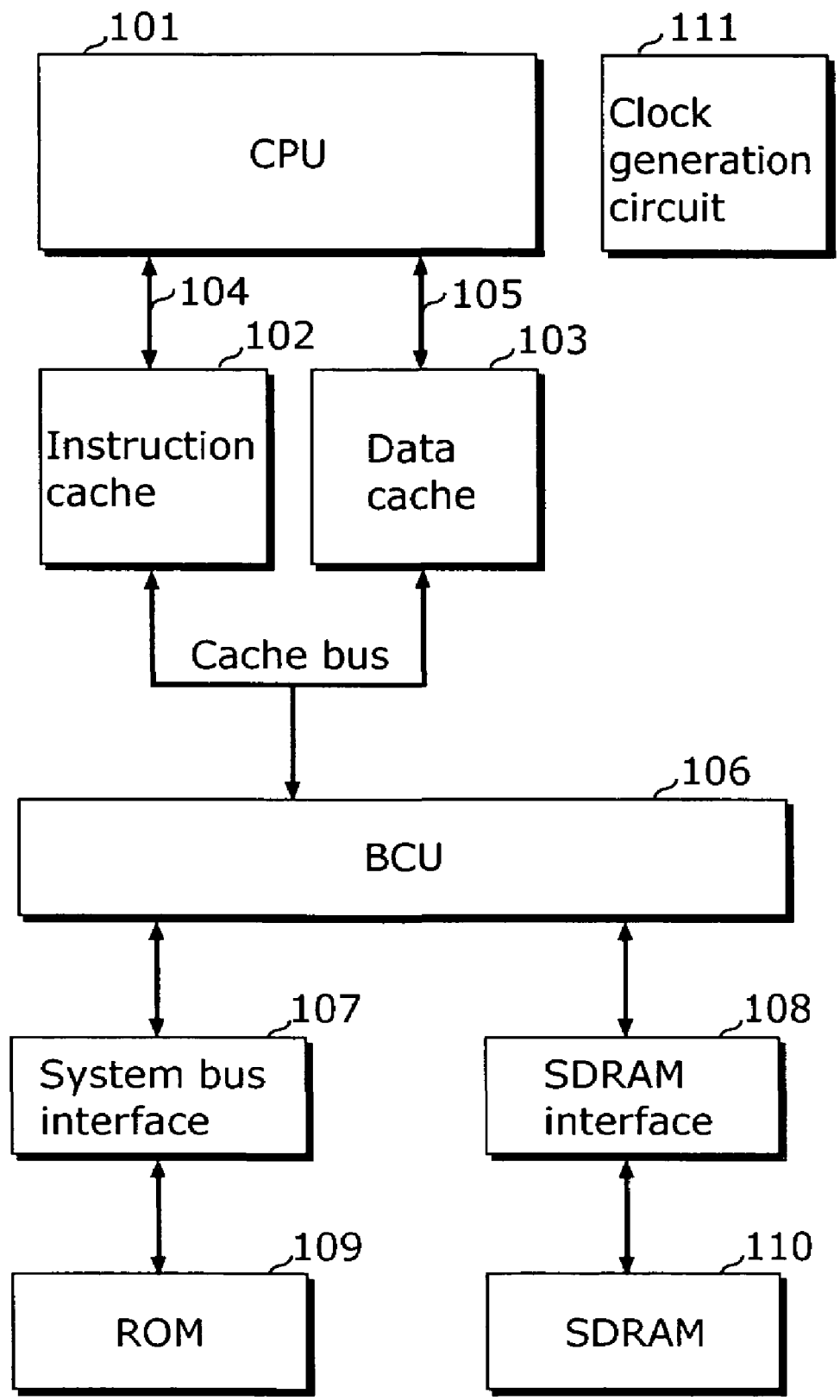
FIG. 1 is a configuration diagram of the processor circuit in the first embodiment of the present invention.

FIG. 1 shows a configuration diagram of a processor circuit in the first embodiment of the present invention. The processor circuit is a high-performance processor with a superscalar architecture, which includes a large-capacity cache, a branch target buffer, and a speculative execution mechanism.

In FIG. 1, 101 is a CPU which executes and performs the processes of an instruction provided by a cache 102 through an instruction bus 104. In addition, during the execution of the instruction, the CPU 101 accesses a data cache 103 through a data bus 105, and carries out reading and writing with respect to the data cache's contents. In addition, 111 is a clock generation circuit which provides a high-speed clock (400 MHz) for each part of the processor circuit including the CPU 101, and the instruction cache 102 and the data cache 103. The processor operates in synchronization with this clock.

The instruction cache 102 and the data cache 103 are high-speed memories which hold a part of the contents of external memories (a ROM 109 and an SDRAM 110) which are connected through a BCU 106. The CPU 101 can carry out high-speed access of the contents held in the instruction cache 102 and data cache 103.

In the case where the instruction or data required by the CPU 101 is not held in the instruction cache 102 and the data cache 103, respectively (cache miss), the required instruction/data is forwarded from a ROM 109 or an SDRAM 110 to the respective caches, through a cache bus, the BCU 106 and a system bus interface 107, as well as an SDRAM interface 108. In the case where the instruction or data required by the CPU 101 is held in the instruction cache 102 and data cache 103, respectively (cache hit), accessing of the instruction cache 102 and data cache 103 by the CPU is completed in one clock cycle. However, in the case of a cache miss, such access requires a few tens to a few hundred clock cycles as accessing of a low-speed memory (ROM 109, SDRAM 110) is involved.

Figure 2:
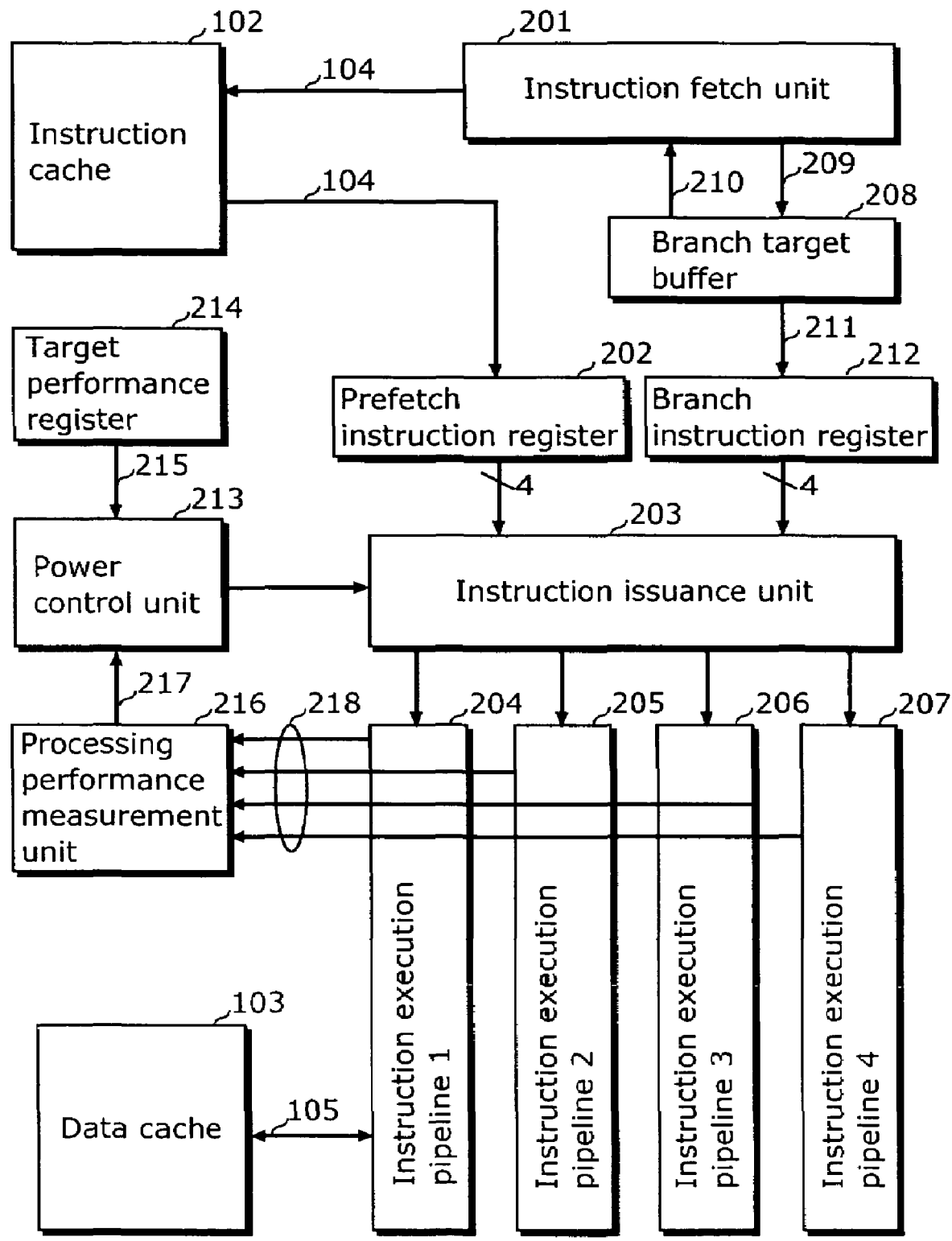
FIG. 2 is an internal configuration diagram of the CPU in the same embodiment.

FIG. 2 shows a detailed internal configuration of the CPU 101. 201 is an instruction fetch unit which performs an instruction fetch request by outputting a fetch address to the instruction cache 102 through the instruction bus 104. The instruction cache 102 provides an instruction corresponding to the fetch address, to a prefetch instruction register 202 through the instruction bus 104. The instruction cache 102 is normally able to provide four instructions per instruction fetch. This is received by the prefetch instruction register 202 which holds four instructions simultaneously. The instructions held in the prefetch instruction register 202 are inputted to an instruction issuance unit 203 and issued to instruction execution pipelines 1 to 4 (204 to 207). The instruction issuance unit 203 judges factors such as the type of the instruction which is determined through the decoding of the instruction, and the resources as well as data necessary for the execution of such instruction. It then selects which among the instruction processing pipelines 1 to 4 can process an executable instruction, and issues such executable instruction accordingly. In particular, as the instruction execution pipeline 1 is connected to the data cache 103 through the data bus 105 and can execute data access processing, instructions involving data access are preferentially issued to it. The instruction issuance unit 203 can issue one instruction each to the respective instruction execution pipelines, and accordingly, a maximum of four instructions per clock cycle. Furthermore, each of the instruction execution pipelines 1 to 4 (204 to 207) can sequentially process instructions, issued by the instruction issuance unit 203, at a rate of one instruction per clock cycle. However, in the case where a cache miss occurs with the data cache 103 while data access process is being executed, processing becomes stagnated during the period (from a few tens to a few hundred clock cycles) in which low-speed memories (ROM 109, SDRAM 110) are accessed, and the processing by the CPU 101 stops.

A branch target buffer 208 provides, based on a value of a program counter 209, inputted from the instruction fetch unit 201, a branch target address 210 and a branch target instruction 211 to the instruction fetch unit 201 and an instruction register 212, respectively. The branch target buffer 208 has a structure which internally holds 64 entries for the following: an address of a branch instruction executed in the past; a branch target address and branch target instructions (four instructions) corresponding to such past branch instruction; and a past branch history (history bit). When a match is detected between the value of the program counter 209 inputted from the instruction fetch unit 201 and any of the branch instruction addresses of the entries, the branch target address and the branch target instruction of such entry are outputted in the branch target address 210 and the branch target instruction 211, respectively. Furthermore, using the history bit of such entry, a prediction (branch prediction) is performed as to whether or not the branching condition of such branch instruction will be satisfied.

The branch target address 210 is inputted to the instruction fetch unit 201 and, in the case where the branch target buffer 208 predicts a branching, the instruction cache is accessed using such address. In the case where the branch target buffer 208 predicts that there will be no branching, the address is set-aside until the branching condition is satisfied. When branching is takes place, instruction fetching with respect to the target address 210 is executed. Four instructions from the entry in the branch target buffer 208 are provided in the branch target instruction 211 and inputted to and held in the branch instruction register 212. Accordingly, the instructions held in the branch instruction register 212 are inputted to the instruction issuance unit 203, and a maximum of 4 instructions per clock cycle can be issued to the instruction execution pipelines 1 to 4 (204 to 207).

As described above, the processor circuit has a superscalar architecture in which four instructions from the prefetch instruction register 202 and four instructions from the branch instruction register 212 are inputted to the instruction issuance unit 203, and from among these, a maximum of four instructions can be issued, in the same cycle, to the instruction execution pipelines 1 to 2 (204 to 207). Furthermore, as the branch target instruction is provided by the branch target buffer 208 to the branch instruction register 212 at a stage prior to the satisfaction of the branching condition, it is possible for the instruction issuance unit 203 to speculatively issue a branch target instruction to the instruction execution pipelines 1 to 4 (204 to 207) prior to the branching. In other words, when a branch instruction is detected by the branch target buffer 208, in addition to the issuance by the prefetch instruction register 202 of instructions to be executed following non-branching, the branch target instruction for branching is issued by the branch instruction register 212 to the instruction execution pipelines 1 to 2 (204 to 207), prior to the satisfaction of the branch condition for such branch instruction. In this case, instructions which are not to be executed after the satisfaction of the branching condition are discontinued while each of such instructions is currently being executed by the instruction execution pipelines 1 to 4 (204 to 207). However, instructions issued in the same cycle, either for branching or non-branching, are executed until the end. In general, even in a superscalar architecture which can issue four instructions per clock cycle, in terms of actual program execution by a processor, execution of two or more instructions in one clock cycle is difficult. However, by increasing the number of instructions that can be issued through the provision of a branch target buffer as well as a speculative instruction execution mechanism such as those previously described, the execution of, on average, two or more instructions in one clock cycle is made possible.

In this manner, although the instruction issuance unit 203 is configured to be able to issue a maximum of four instructions per clock cycle, from the prefetch instruction register 202 and the branch instruction register 212, to the instruction execution pipelines 1 to 2 (204 to 207), the maximum number to be issued for any of the instructions, is determined according to the control of a power control unit 213. More specifically, there are three modes (mode A, mode B and mode C) for the instruction issuance mode of the instruction issuance unit 203. In mode A, maximum instruction issuance is carried out using a speculative instruction execution mechanism. In mode B, when a branch instruction is detected, the speculative instruction execution mechanism is not used, and only the instructions in which branching is predicted, in the branch target buffer 208, are issued. In mode C, the speculative instruction execution mechanism is not used, and the issuance of a maximum of only one instruction per clock cycle is carried out. Accordingly, the execution of two or more instructions per clock cycle, on average, is expected for mode A, and the execution of less than one instruction per clock cycle, on average, is expected for mode C. On average, the number of instructions executed per clock cycle in mode B changes according to the accuracy of the branch prediction at the time of program execution, and is an amount between one and two instructions. In addition, the performance of any of these operations is determined according to the control of the power control unit 213.

Due to the differences in operation in modes A, B, and C, as described above, differences arise in the number of instructions that can by issued by the control of the power control unit 213 to the instruction execution pipelines 1 to 2 (204 to 207). At the same time, differences also arise in the power consumed by the processor circuit. More specifically, the instruction execution pipelines 1 to 4 (204 to 207) are configured so that power consumption is approximately "0" when no instruction is issued. Therefore, in mode A, even an instruction which is to be discontinued due to the satisfaction of a branching condition during the execution of a branch instruction, is issued once to the instruction execution pipelines 1 to 4 (204 to 207) and power is consumed. In contrast, in mode B, only an instruction with branching predicted is issued, and power consumption in the empty instruction execution pipelines can be suppressed. In the case where the branch prediction is wrong, waste arises in terms of performance and power as a re-issuance of the instruction is necessary in the subsequent clock cycle. However, with the fact that, for the common program, the accuracy of branch prediction using the history bit of the branch target buffer 208 is high, the average power consumption is kept down. In mode C, it is clear from the fact that as instructions are issued to only one of the instruction execution pipelines 1 to 4 (204 to 207) at all times, power consumption is greatly reduced.

In order to select one of the three instruction issuance modes of the instruction issuance unit 203, the power control unit 213 receives a target performance value 215 outputted by a target performance register 214, and an execution performance value 217 outputted by a processing performance measurement unit 216. The target performance value 215 and the execution performance value 217 are indicated by the number of instructions executed per $2^{14}$ clock cycles.

Figure 3A:
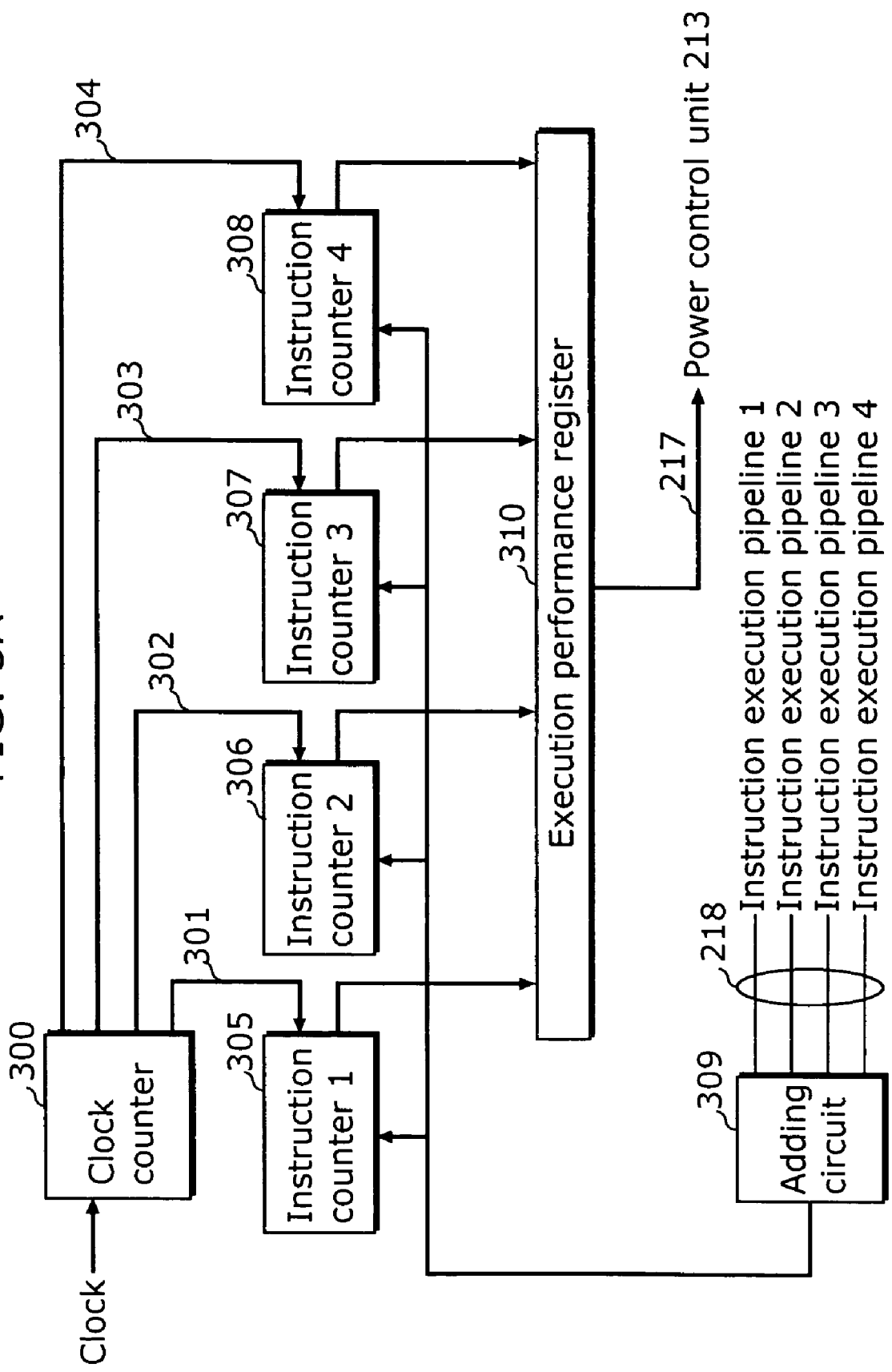
FIG. 3A is an internal configuration diagram of the processing performance measurement unit in the same embodiment.

FIG. 3A shows a detailed internal configuration of the processing performance measurement unit 216. Its time chart is shown in FIG. 3B. 300 is a clock counter which counts the clocks and is made up of a 14-bit binary counter. Counter reset signals 301 to 304 are outputted on the cycle in which the clock count of the clock counter 300 reaches $1 \times (2^{12})$, $2 \times (2^{12})$, and $3 \times (2^{12})$, as well as on the cycle in which the 14-bit counter overflows.

305 to 308 are instruction counters 1 to 4, respectively, which count the number of instructions executed by the instruction execution pipelines 1 to 4 (204 to 207). For this reason, the processing performance measurement unit 216 receives, from the instruction execution pipelines 1 to 4 (204 to 207), an instruction completion signal 218 which indicates the completion of an instruction. The instruction completion signal 218 received from each of the instruction execution pipelines is inputted to an adding circuit 309, and the output is counted by instruction counters 1 to 4 (305 to 308). Here, the instructions counted by the instruction counters 1 to 4 (305 to 308) do not include instructions which, after being speculatively issued to the instruction execution pipelines 1 to 4 (204 to 207), has had their execution discontinued due to the satisfaction of a branching condition. As there is a possibility that the instruction execution pipelines 1 to 4 (204 to 207) will execute one instruction each in one clock cycle, the instruction counters 1 to 4 (305 to 308) are made up of 16-bit counters which can add a maximum of four instructions per clock cycle. The instruction counters 1 to 4 (305 to 308) are inputted with the counter reset signals 301 to 304, respectively. The count values at the time these signals are inputted are set in an execution performance register 310, and at the same time, the count is reset to "0". According to this configuration, the count values in the execution performance register 310 are updated every $2^{12}$ clock cycles by the number of instructions executed in a period of $2^{14}$ clock cycles, and outputted in the execution performance value 217.

The target performance register 214 is a register that can be rewritten according to a program executed by the CPU 101. The performance required to execute the processes of the program is set as the number of instructions executed per $2^{14}$ clock cycles.

The power control unit 213 controls the selection for the mode of the instruction issuance unit 203, based on the target performance value 215 outputted by the target performance register 214 and the execution performance value 217 outputted by the processing performance measurement unit 216, so that the processing performance of the CPU 101 approximately matches the target performance value. More specifically, a configuration is adopted which compares the target performance value 215 and the execution performance value 217 which is updated every $2^{12}$ clock cycles, and carries out control so that switching is carried out to a mode of the instruction issuance unit 203 that allows more instructions to be executed per clock cycle (from mode C to mode B, or from mode B to mode A) when the execution performance value 217 is lower than the target performance value 215, and switching is carried out to a mode of the instruction issuance unit 203 that allows fewer instructions to be executed per clock cycle (from mode A to mode B, or from mode B to mode C) when the execution performance value 217 exceeds the target performance value 215.

The operation of the processor circuit configured in the above manner shall be explained.

The performance required by a program is set in the target performance register 214, and the processing for such program is started. During the period in which the program is being executed, the power control unit 213 compares the execution performance value 217 of the CPU 101 and the set target performance value 215, and continuously performs the control of the instruction issuance unit 203 so that the execution performance value 217 approximates the set target performance value 215. As a result, it is possible to select an operation in a mode of the instruction issuance unit 203, which suppresses power consumption while realizing the target performance required by the program.

Depending on the program, there are cases where the required performance differs according to processing details in each of its parts. However, by rewriting the target performance register 214 with such required performance value, the processor circuit is able to operate with a processing performance that is in accordance with the processing details, and power consumption can be suppressed. Furthermore, during program execution, there are instances where the execution performance value 217 of the CPU 101 temporarily deteriorates due to the deterioration of the accuracy of branch prediction and the deterioration of the hit rate of the cache memory, and so on. However, deterioration of performance can be restrained by switching the operation of the instruction issuance unit 203 to the mode that allows the issuance of the maximum number of instructions per clock cycle (mode A), at the point when such performance deterioration is detected by the power control unit 213.

As described above, by switching the instruction issuance mode of the instruction issuance unit 203 in accordance with the processing performance required by a program and the operating condition of the CPU 101, the processor circuit in the aforementioned configuration realizes the performance of operation in which power consumption is suppressed to the fullest extent while realizing the target performance required by the program.

Second Embodiment

The main configuration of a processor circuit in the second embodiment of the present invention is the same as in FIG. 1 in the first embodiment. This processor is also a high-performance processor with a superscalar architecture, which includes a large-capacity cache, a branch target buffer, and a speculative execution mechanism.

Figure 4:
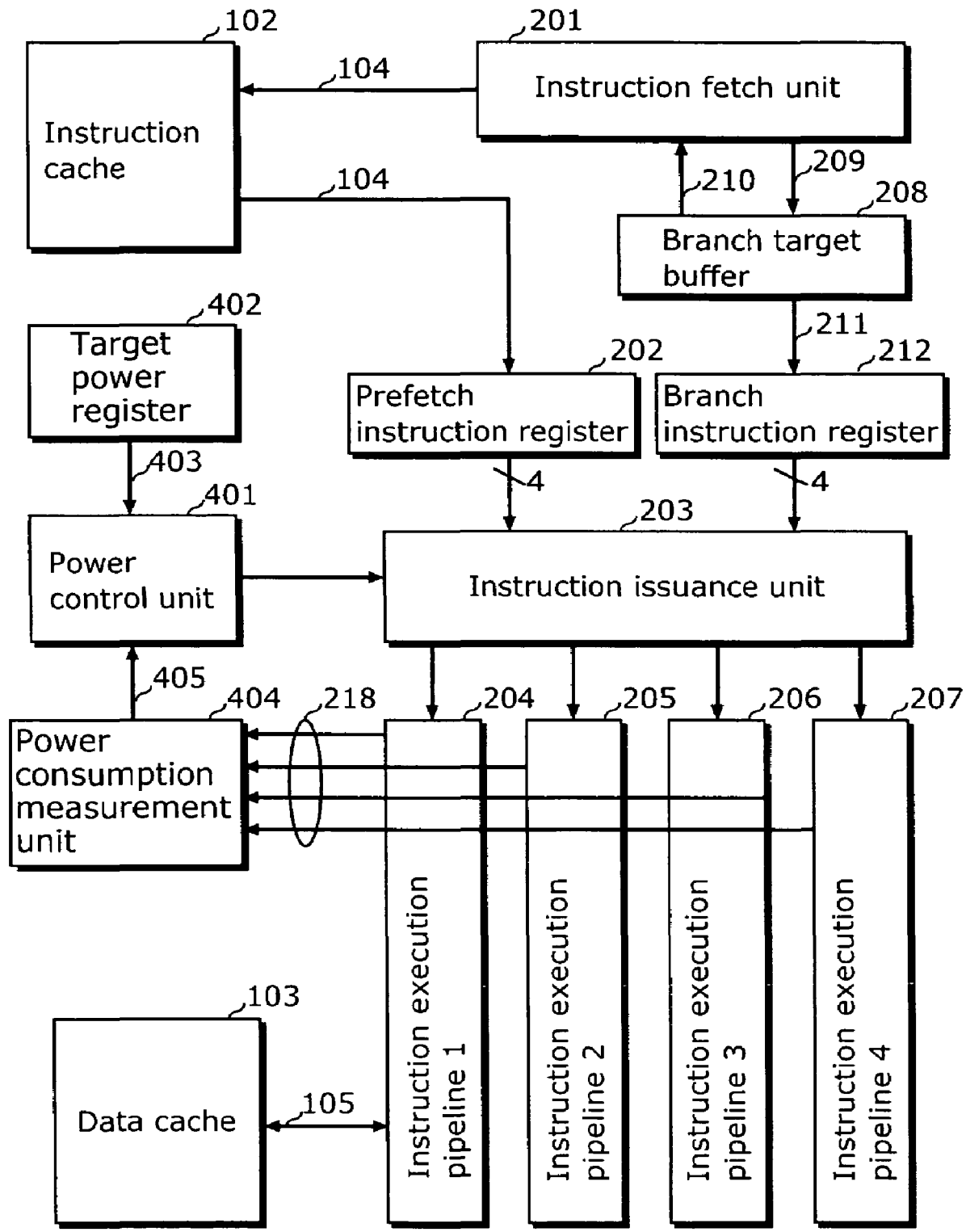
FIG. 4 is an internal configuration diagram of the CPU in the second embodiment of the present invention.

FIG. 4 shows a detailed internal configuration of a CPU 101 in the second embodiment.

Here, an instruction fetch unit 201, a prefetch instruction register 202, a branch target buffer 208, a branch instruction register 212, and each of instruction execution pipelines 1 to 4 (204 to 207) are the same as those in the first embodiment. Furthermore, an instruction issuance unit 203 can also issue, to the instruction execution pipelines 1 to 4 (204 to 207), a maximum of four instructions in one clock cycle from the prefetch instruction register 202 and the branch instruction register 212, and the possession of 3 modes (mode A, mode B, and mode C) for issuing the maximum number of instructions for any of the instructions is the same as in the first embodiment. The mode at which the instruction issuance unit 203 performs the issuance of instructions is determined according to the control of a power control unit 401.

In order to select one of the three instruction issuance modes of the instruction issuance unit 203, the power control unit 401 receives a target power value 403 outputted by a target power register, and an execution power value 405 outputted by a power consumption measurement unit 404. The target power value 403 and the execution power value 405 are indicated by the number times each of the instruction execution pipelines 1 to 4 (204 to 207) are activated per $2^{14}$ clock cycles.

Figure 5:
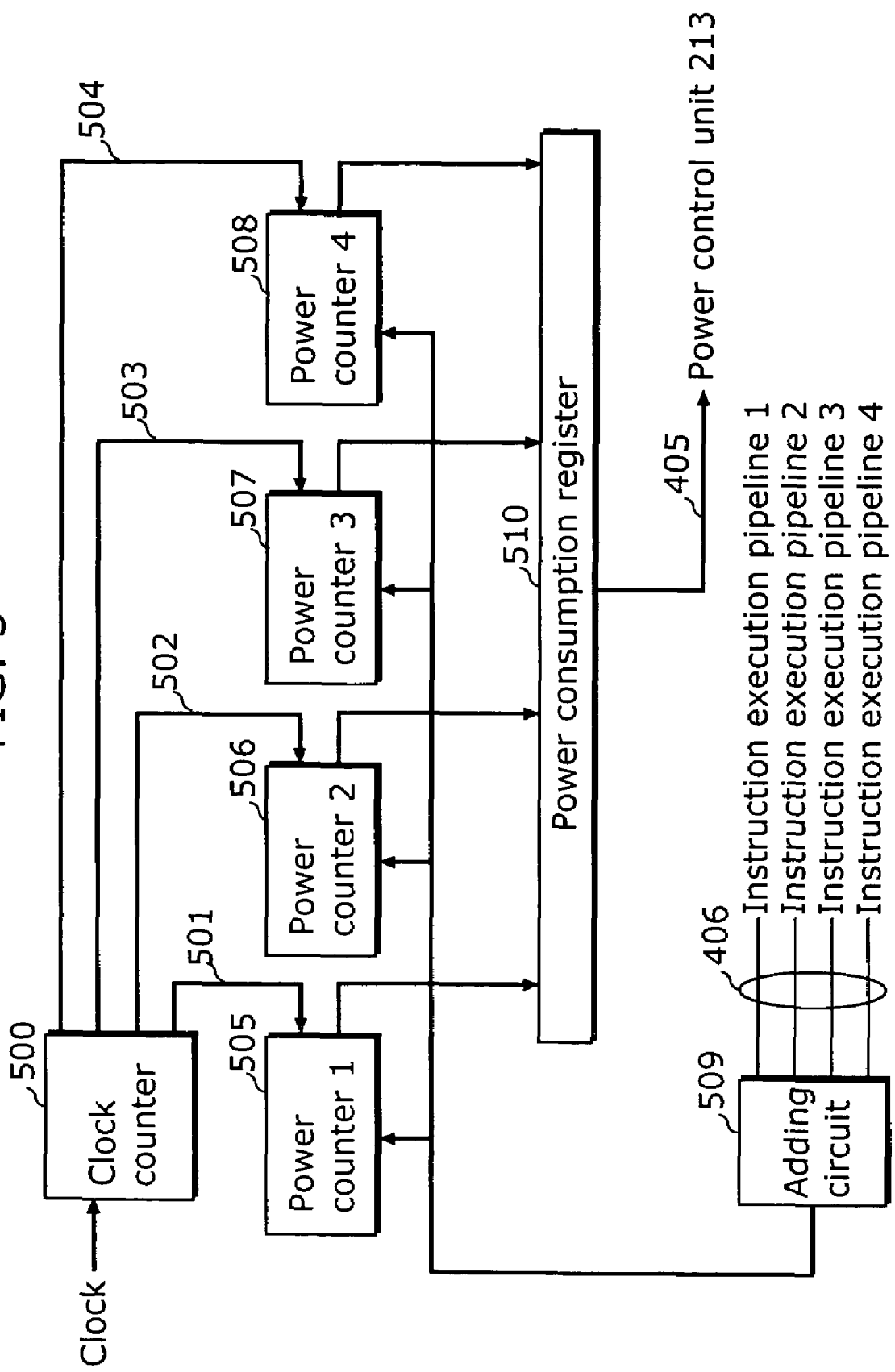
FIG. 5 is an internal configuration diagram of the power consumption measurement unit in the same embodiment.

FIG. 5 shows a detailed internal configuration of the power consumption measurement unit 404.

500 is a clock counter which counts the clocks and is made up of a 14-bit binary counter. Counter reset signals 501 to 504 are outputted on the cycle in which the clock count of the clock counter 500 reaches $1 \times (2^{12})$, $2 \times (2^{12})$, and $3 \times (2^{12})$, as well as on the cycle in which the 14-bit counter overflows.

505 to 508 are power counters 1 to 4, respectively, which count the number of instructions issued to the instruction execution pipelines 1 to 4 (204 to 207). For this reason, the power consumption measurement unit 404 receives an instruction issuance signal 406 which indicates the issuance of an instruction from the instruction issuance unit 203 to the instruction execution pipelines 1 to 4 (204 to 207). The instruction issuance signal 406 received from each of the instruction execution pipelines 1 to 4 (204 to 207) is inputted to an adding circuit 509, and the output is counted in the power counters 1 to 4 (505 to 508). Here, the instructions counted by the power counters 1 to 4 (505 to 508) also include instructions which, after being speculatively issued to the instruction execution pipelines 1 to 4 (204 to 207), has had their execution discontinued due to the satisfaction of a branching condition.

As there is a possibility that the instruction execution pipelines 1 to 4 (204 to 207) will execute one instruction in one clock cycle, the power counters 1 to 4 (505 to 508) are made up of 16-bit counters which can add a maximum of four instructions per clock cycle. The power counters 1 to 4 (505 to 508) are inputted with the counter reset signals 501 to 504, respectively. The count values at the time these signals are inputted are set in an execution power register 510, and at the same time, the count is reset to "0". According to this configuration, the count values in the execution power register 510 are updated every $2^{12}$ clock cycles by the number of instructions issued in a $2^{14}$ clock cycle period, and outputted in the execution power value 405.

The target power register 402 is a register that can be rewritten according to a program executed by the CPU 101. The power consumption allowed for the execution of the processes of such program is set as the number of times that the instruction execution pipelines 1 to 4 (204 to 207) are energized, in other words, the number of instructions issued to each of the instruction execution pipelines, per $2^{14}$ clock cycles.

The power control unit 401 controls the selection for the mode of the instruction issuance unit 203, based on the target power value 403 outputted by the target power register 402 mentioned previously, and the execution power value 405 outputted by the power consumption measurement unit 404, so that the power consumption of the CPU 101 approximately matches the target power value. More specifically, a configuration is adopted which compares the target power value 403 and the execution power value 405 which is updated every $2^{12}$ clock cycles, and carries out control so that switching is carried out to a mode of the instruction issuance unit 203 that allows fewer instructions to be executed per clock cycle (from mode A to mode B, or from mode B to mode C) when the execution power value 405 exceeds the target power value 403, and conversely, switching is carried out to a mode of the instruction issuance unit 203 that allows more instructions to be executed per clock cycle (from mode C to mode B, or from mode B to mode A) when the execution power value 405 is lower than the target power value 403.

The operation of the processor circuit configured in the aforementioned manner shall be explained.

The power consumption allowed for the execution of the processes of a program is set in the target power register 402. In general, the power consumption of a processor circuit is considered as the total of the portion consumed by the instruction execution pipelines 1 to 4 (204 to 207) and the portion consumed by the rest of the circuit elements. However, in the processor circuit in the present configuration, the power consumption of the instruction execution pipelines 1 to 4 (204 to 207) takes up the majority, and the power consumed by the instruction execution pipelines 1 to 4 (204 to 207) changes greatly according to the presence or absence of instruction issuance. Therefore, it is considered appropriate to set the power consumed by the processor circuit as the number of instructions issued to the instruction execution pipelines 1 to 4 (204 to 207) per $2^{14}$ clock cycles.

In the period in which the program is being executed, the power control unit 401 compares the execution power value 405 of the CPU 101 and the set target power value 403, and continuously performs the control of the instruction issuance unit 203 so that the execution power value 405 approximates the set target power value 403. As a result, the instruction issuance unit 203 is able to select the operation for the mode which obtains maximum processing performance while maintaining the target power allowed for the execution of the program.

Depending on the program, there are cases where the allowed power consumption differs according to processing details in each of its parts. However, by rewriting the target performance register 214 with the power consumption allowed for the execution of the program, the processor circuit is able to operate with a power consumption that is in accordance with the processing details, and power consumption can be suppressed. Furthermore, during program execution, there are instances where the execution power value 405 increases temporarily as in cases where branch instructions continue successively, and so on. However, it is possible to suppress the excessive consumption of power by switching the operation of the instruction issuance unit 203 to the mode that allows the issuance of only one instruction per clock cycle (mode C), at the point when such increase is detected by the power control unit 401.

Furthermore, during program execution, there are cases where, due to the deterioration of the hit rate of the cache memory, the number of instructions issued by the CPU 101 to each of the instruction execution pipelines 1 to 4 (204 to 207) decreases and processing performance temporarily deteriorates. In this case, the execution power value 405 also goes down at the same time, and when this is detected by the power control unit 213, the operation of the instruction issuance unit 203 is switched to the mode that allows the issuance of the maximum number of instructions per clock cycle (mode A) so that maximum performance can be recovered, within the allowed power consumption range.

As described above, by switching the instruction issuance mode of the instruction issuance unit 203 in accordance with the power consumption allowed for a program and the operating condition of the CPU 101, the processor circuit in the aforementioned configuration realizes the performance of operation in which maximum processing performance is brought out while maintaining the power consumption allowed for the program.

Note that although in the aforementioned configuration, the power consumed when the instruction execution pipelines 1 to 4 (204 to 207) are issued instructions and are operating, is treated as being the same for all, it should be obvious that the accuracy of the power consumption value 405 is improved by assigning weights in accordance with the instruction execution pipelines 1 to 4 (204 to 207), the type of instruction issued, and so on, when adding is performed by the power consumption measurement unit 404.

Third Embodiment

The main configuration of a processor circuit in the third embodiment of the present invention is the same as in FIG. 1 in the first embodiment. This processor is also a high-performance processor with a superscalar architecture, which includes a large-capacity cache, a branch target buffer, and a speculative execution mechanism.

Figure 6:
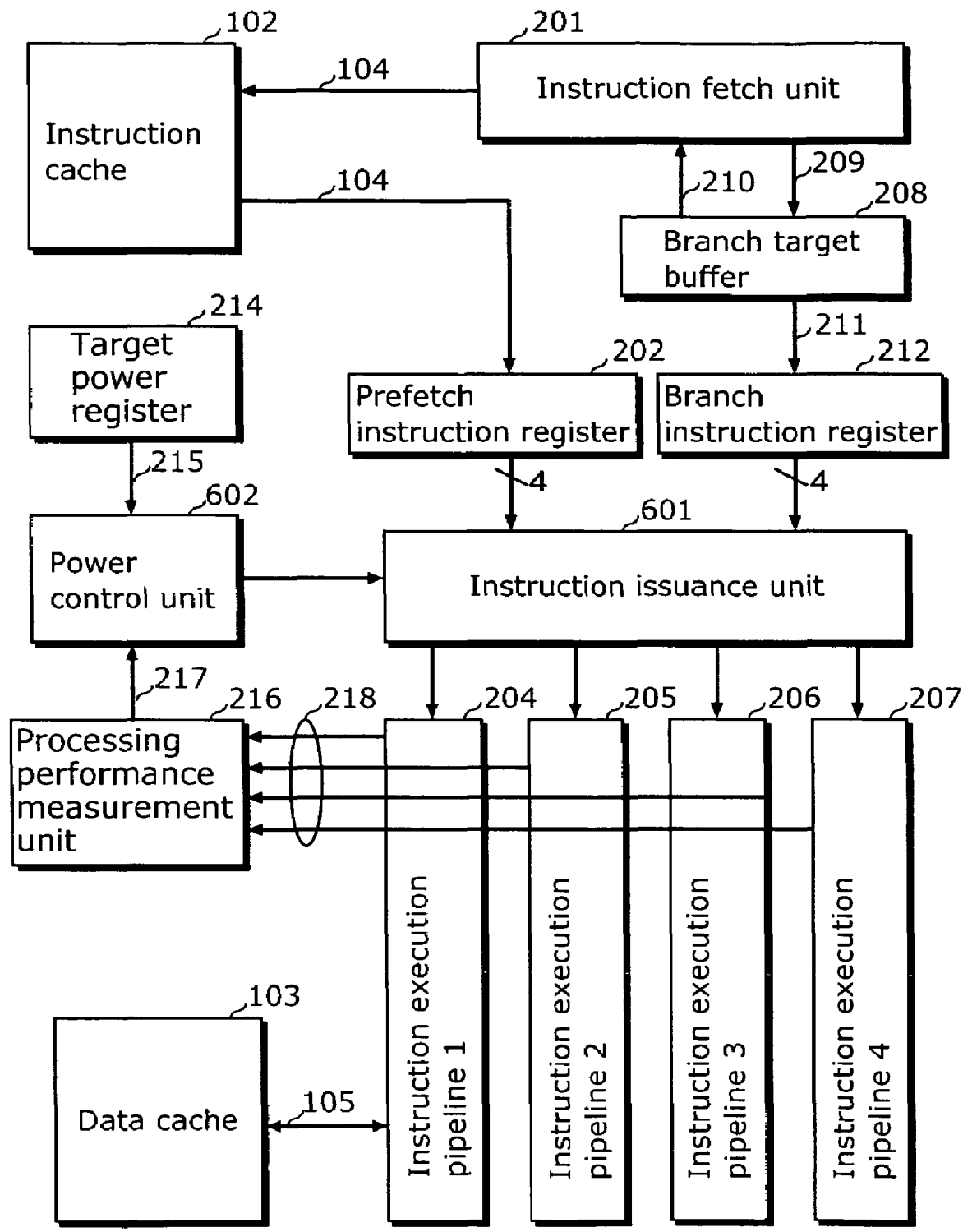
FIG. 6 is an internal configuration diagram of the CPU in the third embodiment of the present invention.

FIG. 6 shows a detailed internal configuration of a CPU 101 in the third embodiment.

Here, an instruction fetch unit 201, a prefetch instruction register 202, a branch target buffer 208, a branch instruction register 212, and each of instruction execution pipelines 1 to 4 (204 to 207) are the same as those in the first embodiment. An instruction issuance unit 601 has the same configuration which allows it to issue, to the instruction execution pipelines 1 to 4 (204 to 207), a maximum of four instructions per clock cycle, from the prefetch instruction register 202 and the branch instruction register 212. It is configured to issue the maximum number of instructions per clock cycle to each of the instruction execution pipelines 1 to 4 (204 to 207).

Furthermore, the configuration of a target performance register 214 and a processing performance measurement unit 216 is the same as in the first embodiment, and the inputting of a target performance value 215 and an execution performance value 217 from these units, to a power control unit 602 is also the same. However, the difference in present embodiment lies in the point where the power control unit 602 performs its control on an instruction cache 102, instead of on the instruction issuance unit 601.

Figure 7:
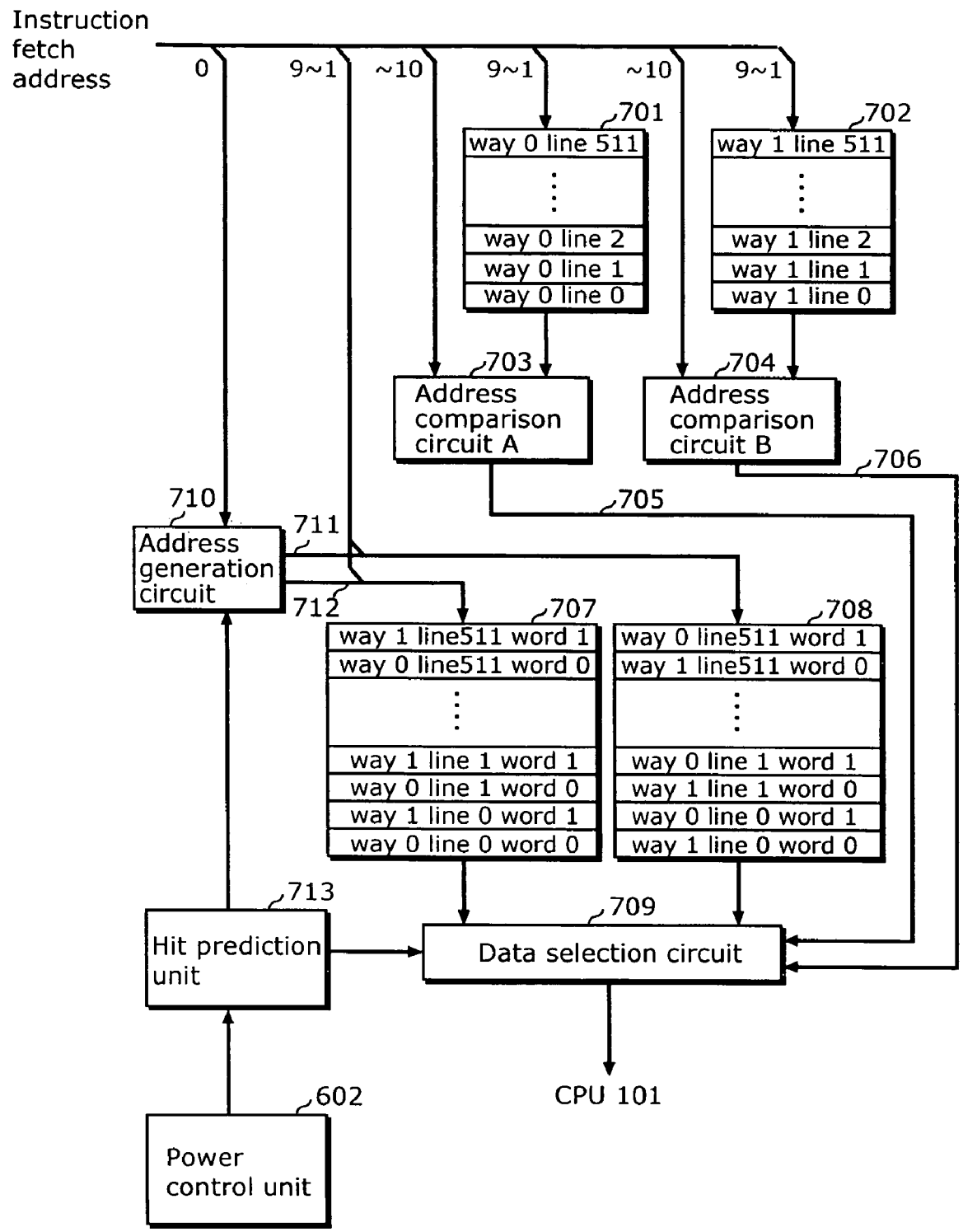
FIG. 7 is an internal configuration diagram of the instruction cache in the same embodiment.

FIG. 7 shows a detailed internal configuration of the instruction cache 102 in the third embodiment.

The instruction cache 102 is a cache memory with a two-way set-associative structure, with each way being made up of 512 lines. Furthermore, the unit for reading (4 instructions) per access of the instruction cache is one word, with one line being made up of two words. Accordingly, the capacity of the instruction cache is 1K (1024) words per way, and 2K (2048) words overall.

701 and 702 are SRAM tag memory arrays A and B making up tags of the instruction cache, and each stores way 0 and way 1 tag addresses, respectively. When the instruction cache is accessed for instruction fetching, tag addresses of corresponding lines are read-out by inputting the 9th to 1st bits ($2^9$ to $2^1$ bits) of an instruction fetch address, as the SRAM address, into the tag memory arrays A 701 to B 702. The respective tag addresses are inputted into address comparison circuits A 703 and B 704. In the address comparison circuits A 703 and B 704, a comparison (hit judgment) of the high bits (10th bit ($2^{10}$ bit) or higher) of the instruction fetch address and the respective tag addresses is performed, and hit signals A 705 and B 706 are generated, respectively, for each way. The configuration of the tag memory arrays and the address comparison circuit is the same as the configuration of a common cache memory.

Meanwhile, 707 and 708 are RAM data memory arrays A and B for holding instructions in the instruction cache. In the present embodiment, the data of way 0 and way 1 are not stored in the data memory arrays A 707 and B 708, respectively. Instead, the data of word 0 of way 0 is stored in the even numbered addresses, and the data of word 1 of way 1 is stored in the odd numbered addresses, in the data memory array A 707. The data of word 0 of way 1 is stored in the even numbered addresses, and the data of word 1 of way 0 is stored in the odd numbered addresses, in the data memory array B 708.

When the instruction cache is to be accessed for instruction fetching, an address A 711 and an address B 712 outputted by an address generation circuit 710 are inputted to the data memory arrays A 707 and B 708, respectively, as the lowest bit of the SRAM addresses, in addition to the 9th to 1st bits of the instruction fetch address. In the data memory arrays A 707 and B 708, this address is used, and corresponding words are read-out and inputted to a data selection circuit 709. The data selection circuit 709 selects either of such words and provides the instructions to the CPU 101.

Using the values of the addresses A 711 and B 712 outputted by the address generation circuit 710, and the selection operation by the data selection circuit 709, two access modes (mode A and mode B) are possible for the read-out accessing of the data memory arrays A 707 and B 708. In mode A, the address generation circuit 710 outputs the value of the 0 bit ($2^0$ bit) of an instruction fetch address as the addresses A 711 and B 712. As a result, the data memory arrays A 707 and B 708 are read using the 9th to 0 bits ($2^9$ to $2^0$ bits) of the instruction fetch address. As a result, in the case where the instruction fetch address is an even number, the instructions of way 0 are read from the data memory array A 707, and the instructions of way 1 are read from the data memory array B 708. In the case where the instruction fetch address is an odd number, the instructions of way 1 are read from the data memory array A 707, and the instructions of way 0 are read from the data memory array B 708. Subsequently, in the data selection circuit 709, selection of data is performed based on the hit signals A 705 and B 706, and the value of the 0 bit of the instruction fetch address. In the case where the instruction fetch address is an even number and the hit signal A 705 indicates a hit or the instruction fetch address is an odd number and the hit signal B 706 indicates a hit, an operation to select the output of the data memory array A 707 is performed. In the case where the instruction fetch address is an odd number and the hit signal A 705 indicates a hit or the instruction fetch address is an even number and the hit signal B 706 indicates a hit, an operation to select the output of the data memory array B 708 is performed. As a result, although the internal structures of the data memory arrays and the data selection circuit 709 are different, the read-out operation as data memory arrays or as an instruction cache is realized in the same manner as the access of a common cache memory, in the operation in mode A.

On the other hand, unlike in the common read-out access of a cache memory, in mode B, the reading-out of two words of a specified way is an operation carried out in a single access. In other words, with regard to a way predicted by a hit prediction unit 713, the address generation circuit 710 outputs the number of such predicted way for the address A 711, and outputs, for the address B 712, a value which is the predicted way number plus 1 (in this case, an inverse value, as the address B 712 is a 1-bit address) and using these together with the 9th to 1st bits of the instruction fetch address, the data memory arrays A 707 and B 708 are read-out. As a result, in the case where the way number predicted by the hit prediction unit 713 is an even number, the instructions of word 0 of such way in the data memory array A 707 and the instructions of word 1 of such way in the data memory array B 708, are read-out. In the case where the way number predicted by the hit prediction unit 713 is an odd number, the instructions of word 1 of such way in the data memory array A 707 and word 0 of such way in the data memory array B 708, are read-out.

Furthermore, in the data selection circuit 709, selection of data is performed based on the value of the 0 bit of the instruction fetch address and the number of the way which is predicted by the hit prediction unit 713. In the case where the instruction fetch address is an even number and the number of the way predicted by the hit prediction unit 713 is an even number, or the instruction fetch address is an odd number and the number of the predicted way number is an odd number, an operation which selects the output of the data memory array A 707 is performed. In the case where the instruction fetch address is an even number and the number of the way predicted by the hit prediction unit 713 is an odd number, or the instruction fetch address is an odd number and the number of the predicted way number is an even number, an operation which selects the output of the data memory array B 708 is performed.

Even in the operation in mode B, the same access is performed on the tag memory arrays A 701 and B 702 as in mode A, and hit signals A 705 and B 706 are generated. Here, in the case where the way which is predicted to be hit by the hit prediction unit 713 matches the result for the hit signals A 705 and B 706, the instruction fetch access, in the aforementioned access of the data memory arrays A 707 and B 708, is completed with the outputting of the instructions selected by the data selection circuit 709, to the CPU 101. However, in the case where the hit prediction by the hit prediction unit 713 does not match the result for the access of the tag memory arrays A 701 and B 702, control is performed so that the hit prediction by the hit prediction 713 is corrected, the data memory arrays A 707 and B 708 are accessed again, and the instructions selected by the data selection circuit 709 are outputted to the CPU 101. In this case, a delay (one clock cycle) arises in the provision of instructions to the CPU 101 as the accessing of the data memory arrays is executed again.

In addition, in the operation in mode B, in the case where a subsequent instruction fetch access is for an adjacent word within the same line of the previously mentioned access, instructions are provided to the CPU 101 without carrying out accessing of the data memory arrays A 707 and B 708. In other words, in the operation in mode B, the instructions for two words of the same line are read out simultaneously from the data memory arrays A 707 and B 708. Furthermore, in the case where the instructions of the two words are required in successive instruction fetch accesses, the instructions are provided, without having to access the data memory arrays A 707 and B 708 again, by switching the selection by the data selection circuit 709.

In this manner, in the operation in mode A, for every instruction fetch access, the tag memory arrays A 701 and B 702 and the data memory arrays A 707 and B 708 are accessed and instructions are provided to the CPU 101. In contrast, in the operation in mode B, in the case where words in the same line are required in successive instruction fetch accesses, for each of the instruction fetch accesses in such accesses, instructions are provided to the CPU 101 without accessing any of the tag memory arrays A 701 and B 702 and the data memory arrays A 707 and B 708. Here, as the percentage of accessing successive addresses is high particularly in the instruction fetch accessing by the processor circuit, and the instruction cache consumes the majority of power in the read-out access of the tag memory arrays A 701 and B 702 as well as the data memory arrays A 707 and B 708, the power consumed by the instruction cache in mode B operation is reduced to up to half of the power consumed in mode A operation. However, as previously described, in the case where the hit prediction (way) by the hit prediction unit 713 is wrong in the mode B operation, a delay arises in the provision of instructions to the CPU 101 which becomes a cause for the deterioration of the performance of the CPU 101.

The power control unit 602 receives the target performance value 215 outputted by the target performance register 214 and the execution performance value 217 outputted by the processing performance measurement unit 216, in order to choose one of the two operation modes of the instruction cache 102. Both the target performance value 215 and the execution performance value 217 are indicated by the number of instructions executed per $2^{14}$ clock cycles. Here, the configuration of the target performance register 214 and the processing performance measurement unit 216 is the same as in the first embodiment.

Based on the target performance value 215 outputted by the target performance register 214 and the execution performance value 217 outputted by the processing performance measurement unit 216, the power control unit 602 controls the selection of the mode for the instruction cache 102 so that the processing performance of the CPU 101 approximately matches the target performance value. More specifically, a configuration is adopted which compares the target performance value 215 and the execution performance value 217 which is updated every $2^{12}$ clock cycles, and control is carried out to switch the operation of the instruction cache 102 to mode A so that instructions are provided to the CPU 101 without delays, in the case where the execution performance value 217 is below the target performance value 215, and conversely, to switch operation to mode B which reduces the power consumption of the instruction cache 102, even if there is a delay in providing instructions to the CPU 101, in the case where the execution performance value 217 exceeds the target performance value 215.

The operation of the processor circuit configured in the aforementioned manner shall be explained.

The performance required by such program is set in the target performance register 214, and the processing for such program is started. During the period in which the program is being executed, the power control unit 602 compares the execution performance value 217 of the CPU 101 and the set target performance value 215, and continuously performs the control of the instruction cache 102 so that the execution performance value 217 approximates the set target performance value 215. As a result, operation in a mode which can suppress power consumption while the CPU 101 realizes the target performance required by the program is selected.

As described above, in the processor circuit in the aforementioned configuration, performance of operation in which power consumption is suppressed to the fullest extent while realizing the target performance required by the program is realized by switching the operation mode of the instruction cache 102 in accordance with the processing performance required by a program and the operating condition of the CPU 101.

Moreover, it is obvious that by adopting a configuration which replaces the processing performance measurement unit 216 in the aforementioned configuration with a target performance register, and which includes a power target register, and a power consumption measurement unit which estimates power consumption based on the operating condition of tag memory arrays and data memory arrays of the instruction cache, and by switching the operation mode of the instruction cache 102 in accordance with the power consumption allowed for a program and the operating condition of the CPU 101 as in the second embodiment, it is possible to carry out an operation which brings out maximum processing performance while maintaining the power consumption allowed for the program.

Furthermore, although the power control unit 602 controls the operation mode of the instruction cache in the aforementioned description, it is obvious that the same effect can be realized by adopting a configuration in which the data cache also has operation modes in the same manner, and in addition, the operation mode of the data cache is also controlled by the power control unit 602.

Fourth Embodiment

The main configuration of the processor circuit and the internal configuration of the CPU 101 in the fourth embodiment of the present invention are the same as those in FIG. 1 in the first embodiment and FIG. 6 in the third embodiment, respectively.

Figure 8:
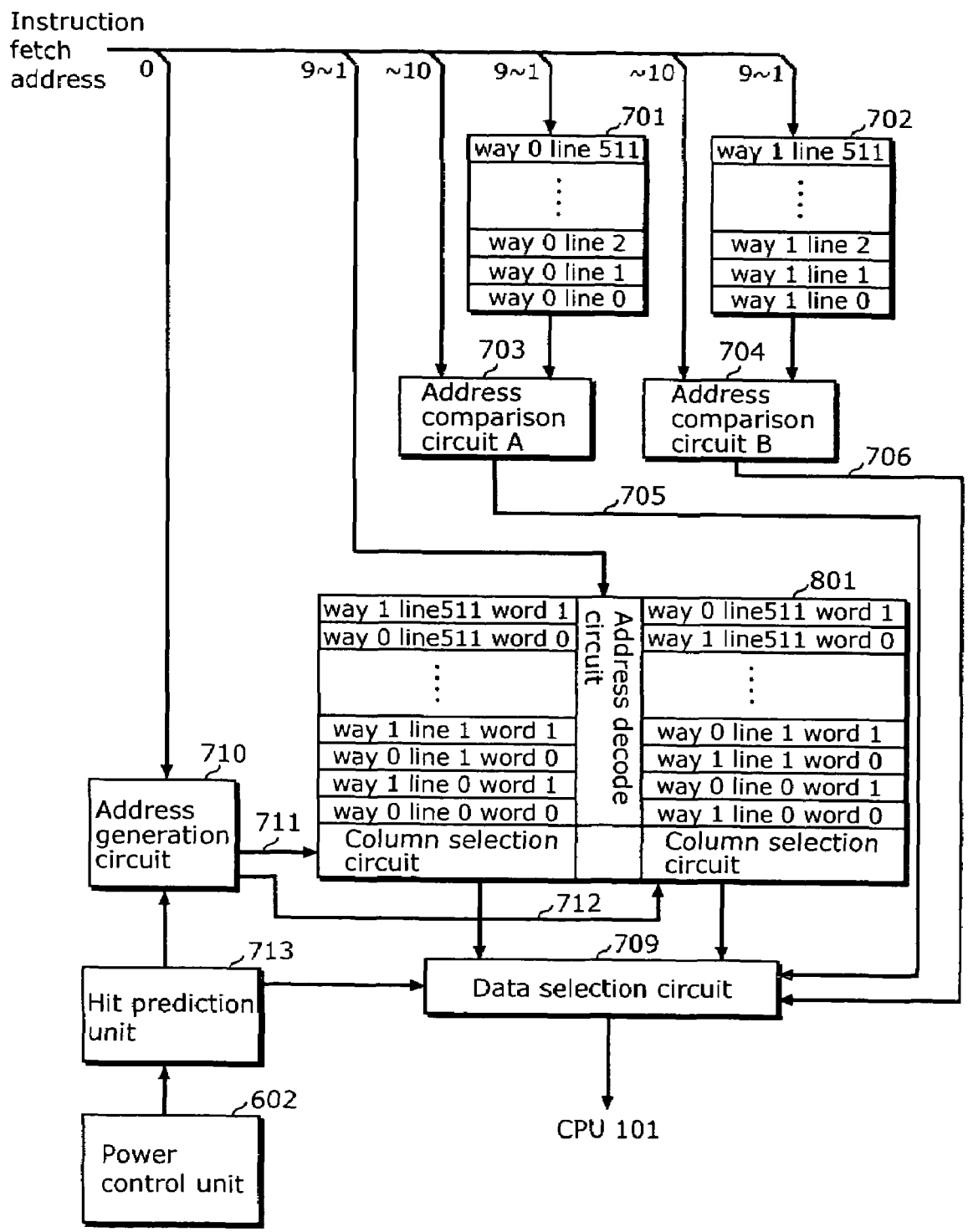
FIG. 8 is an internal configuration diagram of the instruction cache in the fourth embodiment of the present invention.

FIG. 8 shows the detailed internal configuration of an instruction cache 102 in the fourth embodiment. The instruction cache has the same configuration as that in the third embodiment and is a cache memory with a two-way, set-associative structure, with each way being made up of 512 lines. The difference with the third embodiment lies in the structure of an SRAM data memory array 801 for holding an instruction registered in the instruction cache. Here, the two SRAM arrays of the data memory array A 707 and B 708 in the third embodiment is configured as a single SRAM array capable of reading-out two words simultaneously. Furthermore, the SRAM making up the data memory array 801 is internally a two-column (a circuit configuration which selects from two groups of bit lines, and connects to the sense amplifier) memory.

Figure 9:
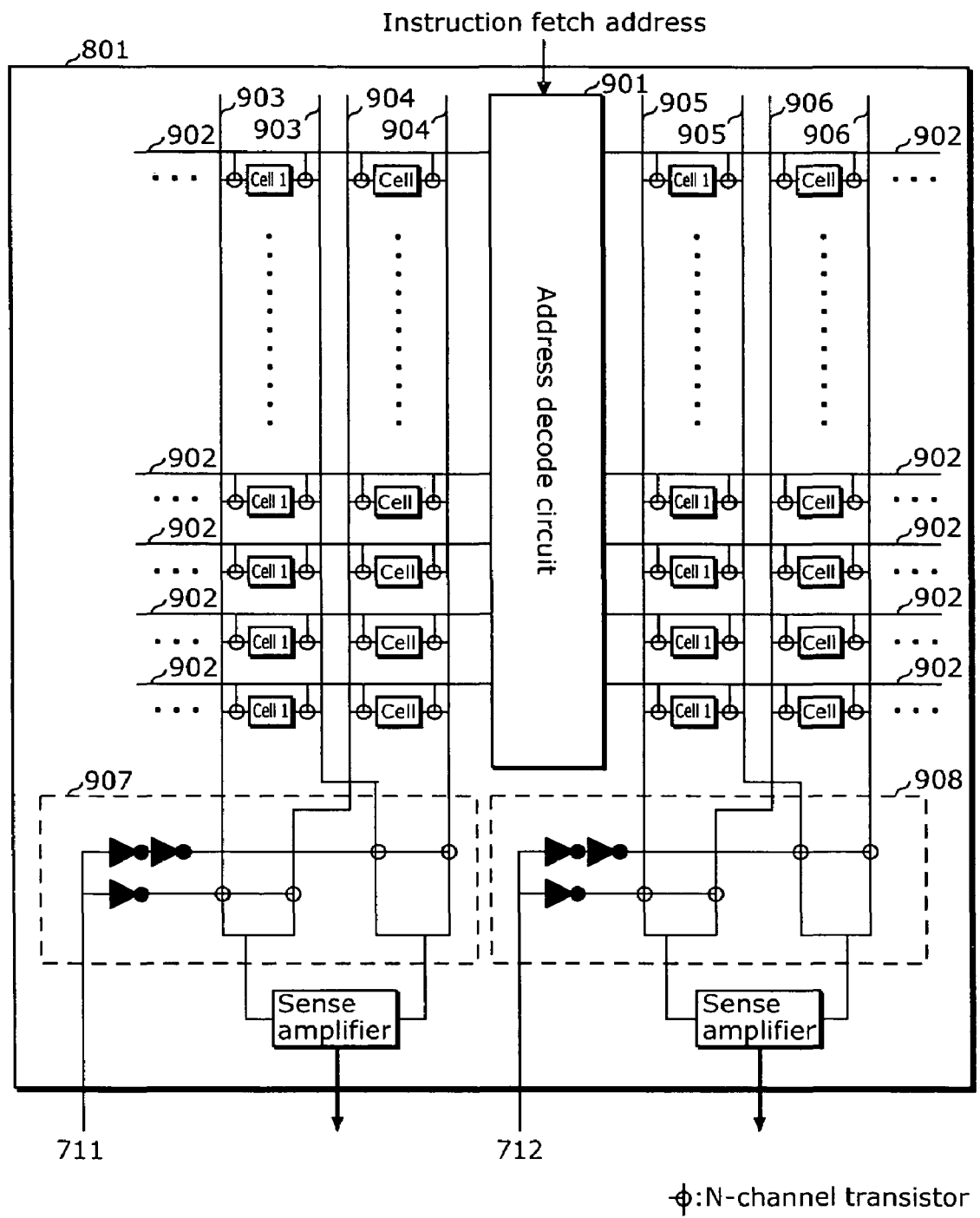
FIG. 9 is an internal configuration diagram of the data memory array in the same embodiment.

FIG. 9 shows the internal circuitry of the data memory array 801. The diagram schematically represents respective bits of each word in the internal read-out circuits located on both sides of a centrally-located address decode circuit 901. In actuality, as many of such read-out circuits are lined-up as the number of bits which make up a word. Here, the address decode circuit 901 decodes the 9th to 1st bits of an instruction fetch address, and generates a word line 902. The word line 902 is generated, in common, for both words.

The word line 902 is connected to a gate of each N-channel transistors joining memory cells and bit lines 903 to 906. The bit lines 903 to 906 are connected to memory cells of word 0 of an even way, word 1 of an odd way, word 0 of an odd way, and word 1 of an even way, respectively. The bit line 903 and the bit line 904 are inputted in a column selection circuit A 907 and selected by a selection circuit made from the N channel transistor and controlled according to an address A 711 outputted by an address generation circuit 710. Here, when the address A 711 is 0, the bit line 903, in other words, word 0 of an even way, is selected. When address A 711 is 1, the bit line 904, in other words, word 1 of an odd way, is selected. Such value is amplified in a sense amplifier then outputted. At the same time, the bit line 905 and the bit line 906 are inputted in a column selection circuit B 908, and selected by a selection circuit made from the N channel transistor and controlled according to an address B 712 outputted by an address generation circuit 710 and. Here, when the address B 712 is 0, the bit line 905, in other words, word 0 of an odd way is selected, and when B 712 is 1, the bit line 906, in other words, word 1 of an even way is selected, and then outputted.

Accordingly, the data memory array 801 is able to perform the same operation as the data memory arrays A 707 and B 708 in the third embodiment. As such, a configuration for performing, as an instruction cache, two operation modes (mode A and mode B) is adopted. Furthermore, by switching the operation mode of the instruction cache 102 in accordance with the processing performance required by a program and the operating condition of the CPU 101, in the processor circuit in such configuration, the performance of an operation which suppresses power consumption to the fullest extent while realizing the target performance required by the program is realized.

In addition, in this configuration, the data memory array 801 is configured as a single SRAM memory having column selection circuits which allow independent controlling on a per word basis. Therefore, a structure in which the address decode circuit 901 is shared can be adopted, and the reduction of the circuitry area required by the instruction cache is realized.

Fifth Embodiment

Figure 10:
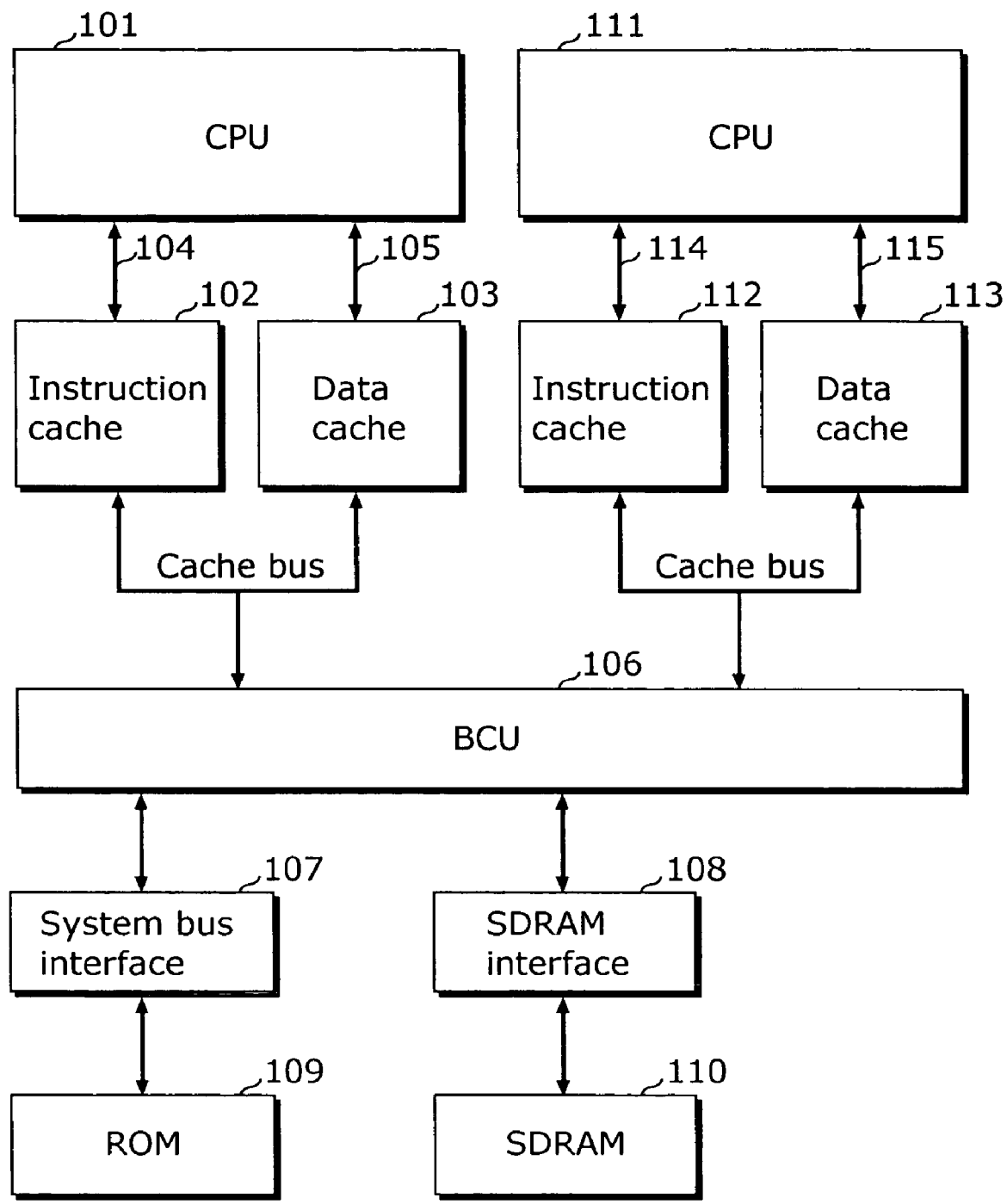
FIG. 10 is a configuration diagram of the processor circuit in the fifth embodiment of the present invention.

FIG. 10 shows a configuration diagram of a processor circuit in the fifth embodiment of the present invention. This processor circuit is a high-performance processor with a multiprocessor structure having a two-CPU with shared memory system.

In FIG. 10, a CPU 101, an instruction cache 102, a data cache 103, a BCU 106, a system bus interface 107, an SDRAM interface 108, a ROM 109, and an SDRAM 110 are the same as those in the first embodiment. Furthermore, although a CPU 111, an instruction cache 112, and a data cache 113 are added to the configuration in the first embodiment through connections 114 and 115, these elements are the same as the CPU 101, the instruction cache 102, and the data cache 103, respectively. In addition, cache buses connecting the CPU 101 and the CPU 111, respectively, to the BCU 106, have a two-word width.

Furthermore, the internal configuration of the instruction cache 102, the data cache 103, the instruction cache 112, and the data cache 113 is the same as the configuration of the instruction cache in the third embodiment, shown in FIG. 7. With respect to a data memory array A 707, data of word 0 of way 0 is stored in an even numbered address, and data of word 1 of way 1 is stored in an odd numbered address. With respect to a data memory array B 708, data of word 0 of way 1 is stored in an even numbered address, and data of word 1 of way 0 is stored in an odd numbered address.

In the processor circuit configured in the aforementioned manner, the CPU 101 and the CPU 111 operate using a shared memory. In order to guarantee the consistency of the contents of their respective cache memories, there exists an operation for transmitting, through the BCU 106, instructions or data stored in a specific line of a way in the cache memory of each CPU. In this case, in the cache memory that is the transmission source, an address generation circuit 710 outputs the number of the way to be transmitted for an address A 711, and outputs a value which is the value of such predicted way number plus 1 (in this case, an inverse value as the address B 712 is a 1-bit address) for an address B 712, and the reading of the data memory arrays A 707 and B 708 is carried out in compliance with the number of the line to be transmitted. As a result, in the case where the way number to be transmitted is an even number, the instructions of word 0 of such way in the data memory array A 707 and the instructions of word 1 of such way in the data memory array B 708, are read-out. In the case where the way number is an odd number, the instructions of word 1 of such way in the data memory array A 707 and the instructions of word 0 of such way in the data memory array B 708, are read-out. In other words, the reading of the two words of the specific line of the way is executed with this single access. The instructions or data which are read-out are outputted through the cache buses, and transmitted, via the BCU 106, to the transmission destination cache memories.

As described above, the processor circuit configured in the aforementioned manner has a configuration that allows two words making up a line of a way in a cache memory to be stored in arrays, which are different data memory arrays, and read out simultaneously. Therefore, in the case where transmission of the instructions or data stored in the lines is carried out between cache memories, the number of read-out accesses to the data memory arrays can be held down to a minimum, and factors hampering normal accesses to the cache memories can be reduced.

Although only some exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention.

INDUSTRIAL APPLICABILITY

The processing apparatus in the present invention bears the effect of enabling the realization of performing a CPU operation which suppresses power consumption to the fullest extent while bringing out a target performance required by a program by i) switching between the use or non-use of motivated instruction issuance, or ii) switching the number of instructions that can me issued simultaneously, or iii) switching the method for accessing data arrays of a cache, in accordance to the processing performance required by the program and the condition of the moment-to-moment processing performance brought out by the CPU. The processing apparatus in the present invention is useful as a processor for use in an LSI such as a microprocessor.

What is claimed is:

1. A processing apparatus which executes a program and performs processes of the program, said processing apparatus, comprising, an execution circuit having a plurality of operation modes, each having a different effect on processing performance and power consumption of said processing apparatus;

a measurer that measures a process execution performance of said processing apparatus; and a controller that compares a target value with a measurement result from said measurer, and that switches the plurality of operation modes in accordance with a result of the comparison, wherein said execution circuit includes:

a plurality of instruction execution pipelines, each of the plurality of instruction execution pipelines executing an instruction; and an instruction issuer that simultaneously issues a plurality of instructions to said plurality of instruction execution pipelines, wherein said measurer measures the process execution performance, based on a number of instructions processed by said plurality of instruction execution pipelines per predetermined period of time, wherein said instruction issuer operates in said plurality of operation modes, each having a different maximum allowable number for said number of instructions that are allowed to be simultaneously issued to said plurality of instruction execution pipelines, wherein said measurer measures said number of instructions as the process execution performance of said processing apparatus, and wherein said controller switches a current operation mode of said instruction issuer to an operation mode having a lower maximum allowable number when the process execution performance measured by said measurer exceeds the target value, and switches to an operation mode having a higher maximum allowable number when the process execution performance measured by said measurer is below the target value.

2. The processing apparatus according to claim 1, wherein said measurer measures, as the process execution performance, said number of instructions that are completely executed by said instruction execution pipelines per said predetermined period of time.

3. The processing apparatus according to claim 1, further comprising:
a rewritable register to which the target value is written.

4. The processing apparatus according to claim 1,
wherein said instruction issuer further operates in an operation mode in which the instructions can be speculatively issued to said instruction execution pipelines, and
wherein said controller switches the operation mode of said instruction issuer to an operation mode in which instructions are speculatively issued when the process execution performance measured by said measurer is below the target value.

5. A processing apparatus which executes a program and performs processes of the program, said processing apparatus comprising:
an execution circuit having a plurality of operation modes, each having a different effect on processing performance and power consumption of said processing apparatus;
a measurer that measures a process execution performance of said processing apparatus; and
a controller that compares a target value with a measurement result from said measurer, and that switches the plurality of operation modes in accordance with a result of the comparison,
wherein said execution circuit includes:
a plurality of instruction execution pipelines, each of the plurality of instruction execution pipelines executing an instruction; and
an instruction issuer that simultaneously issues a plurality of instructions to said plurality of instruction execution pipelines, and
wherein said measurer measures the process execution performance, based on a number of instructions processed by said plurality of instruction execution pipelines per predetermined period of time,
wherein said instruction issuer operates in said plurality of operation modes, each having a different maximum allowable number for said number of instructions that are allowed to be simultaneously issued to said plurality of instruction execution pipelines,
wherein said measurer measures said number of instructions as an execution power consumption of said processing apparatus, and
wherein said controller switches a current operation mode of said instruction issuer to an operation mode having a lower maximum allowable number when the execution power consumption measured by said measurer exceeds the target value, and switches to an operation mode having a higher maximum allowable number when the execution power consumption measured by said measurer is below the target value.

6. The processing apparatus according to claim 5,
wherein said measurer measures, as the execution power consumption, said number of instructions that are issued to said instruction execution pipelines per said predetermined period of time.

7. The processing apparatus according to claim 5, further comprising:
a rewritable register to which the target value is written.

8. The processing apparatus according to claim 5,
wherein said instruction issuer further operates in an operation mode in which the instructions can be speculatively issued to said instruction execution pipelines, and
wherein said controller switches the operation mode of said instruction issuer to an operation mode in which instructions can be speculatively issued when the execution power consumption measured by said measurer is below the target value.

9. A processing apparatus which executes a program and performs processes of the program, said processing apparatus, further comprising:
an execution circuit having a plurality of operation modes, each having a different effect on processing performance and power consumption of said processing apparatus;
a measurer that measures a process execution performance of said processing apparatus; and
a controller that compares a target value with a measurement result from said measurer, and that switches the plurality of operation modes in accordance with a result of the comparison,
wherein said execution circuit includes:
a plurality of instruction execution pipelines, each of the plurality of instruction execution pipelines executing an instruction; and
an instruction issuer that simultaneously issues a plurality of instructions to said plurality of instruction execution pipelines; and
a cache memory having an N-way set-associative structure with N ways in which one line comprises plural words,
wherein said cache memory includes:
a data memory array,
said data memory array can be read-out using one of a type one read-out and a type two read-out,
in the type one read-out, plural words in the same word positions within respective lines are simultaneously read-out from corresponding lines belonging to different ways,
in the type two read-out, plural words making up one line of one way are simultaneously read-out,
said cache memory has a first operation mode and a second operation mode,
in the first operation mode, a word belonging to a way which is accessed by a memory access is selected from among the plural words read-out using the type one read-out, and the selected word is outputted,
in the second operation mode, plural words are read-out, from a way which is predicted to be accessed, using the type two read-out, and when the predicted way is accessed, the plural words are sequentially selected and outputted, and when a way other than the predicted way is accessed, plural words are further read-out, from the way which is accessed, using the type two read-out, and the selected plural words are sequentially selected and outputted,
wherein said measurer measures the process execution performance, based on a number of instructions processed by said plurality of instruction execution pipelines per predetermined period of time,
wherein said measurer measures said number of instructions as the process execution performance of said processing apparatus, and wherein said controller controls said cache memory to operate in the second operation mode when the process execution performance measured by said measurer exceeds the target value, and in the first operation mode when the process execution performance measured by said measurer is below the target value.

10. The processing apparatus according to claim 9, wherein said measurer measures, as the process execution performance, said number of instructions that are completely executed by said instruction execution pipelines per said predetermined period of time.

11. The processing apparatus according to claim 9, further comprising:
a rewritable register to which the target value is written.

12. The processing apparatus according to claim 9, wherein said data memory array comprises a plurality of SRAM memories which can be read-out in word-widths.

13. The processing apparatus according to claim 9, wherein said data memory array comprises one or more SRAM memories which can be read-out in multiple word-widths,
each of the SRAM memories comprises plural columns, and
each of the SRAM memories receives a signal separately for each of the plural words, the signal controlling selection of the columns.

14. A processing apparatus which executes a program and performs processes of the program, said processing apparatus comprising:
an execution circuit having a plurality of operation modes, each having a different effect on processing performance and power consumption of said processing apparatus;
a measurer that measures a process execution performance of said processing apparatus; and
a controller that compares a target value with a measurement result from said measurer, and to switch the plurality of operation modes in accordance with a result of the comparison,
wherein said execution circuit includes:
a plurality of instruction execution pipelines, each of the plurality of instruction execution pipelines executing an instruction; and
an instruction issuer that simultaneously issues a plurality of instructions to said plurality of instruction execution pipelines, and
wherein said measurer measures the process execution performance, based on a number of instructions processed by said plurality of instruction execution pipelines per predetermined period of time, further comprising:
a cache memory having an N-way set-associative structure with N ways in which one line comprises plural words, wherein said cache memory includes:
a data memory array,
said data memory array can be read-out using one of a type one read-out and a type two read-out,
in the type one read-out, plural words in the same word positions within respective lines are simultaneously read-out from corresponding lines belonging to different ways,
in the type two read-out, plural words making up one line of one way are simultaneously read-out,
said cache memory has a first operation mode and a second operation mode,
in the first operation mode, a word belonging to a way which is accessed by a memory access is selected from among the plural words read-out using the type one read-out, and the selected word is outputted,
in the second operation mode, plural words are read-out, from a way which is predicted to be accessed, using the type two read-out, and when the predicted way is accessed, the plural words are sequentially selected and outputted, and when a way other than the predicted way is accessed, plural words are further read-out, from the way which is accessed, using the type two read-out, and the selected plural words are sequentially selected and outputted,
wherein said measurer measures said number of instructions as execution power consumption of said processing apparatus, and
wherein said controller controls said cache memory to operate in the second operation mode, in the case where the execution power consumption measured by said measurer exceeds the target value, and in the first operation mode, in the case where the execution power consumption measured by said measurer is below the target value.

15. The processing apparatus according to claim 14, wherein said measurer measures, as the execution power consumption, the number of memory access instructions which cause said data memory array to be read-out per said predetermined period of time.

16. The processing apparatus according to claim 14, further comprising:
a rewritable register to which the target value is written.

17. The processing apparatus according to claim 14, wherein said data memory array comprises a plurality of SRAM memories which can be read-out in word-widths.

18. The processing apparatus according to claim 14, wherein said data memory array includes one or more SRAM memories which can be read-out in multiple word-widths,
wherein each of the SRAM memories includes plural columns, and
wherein each of the SRAM memories memory receives a signal separately for each of the plural words, the signal controlling selection of the columns.

* * * * *